Figure 1:
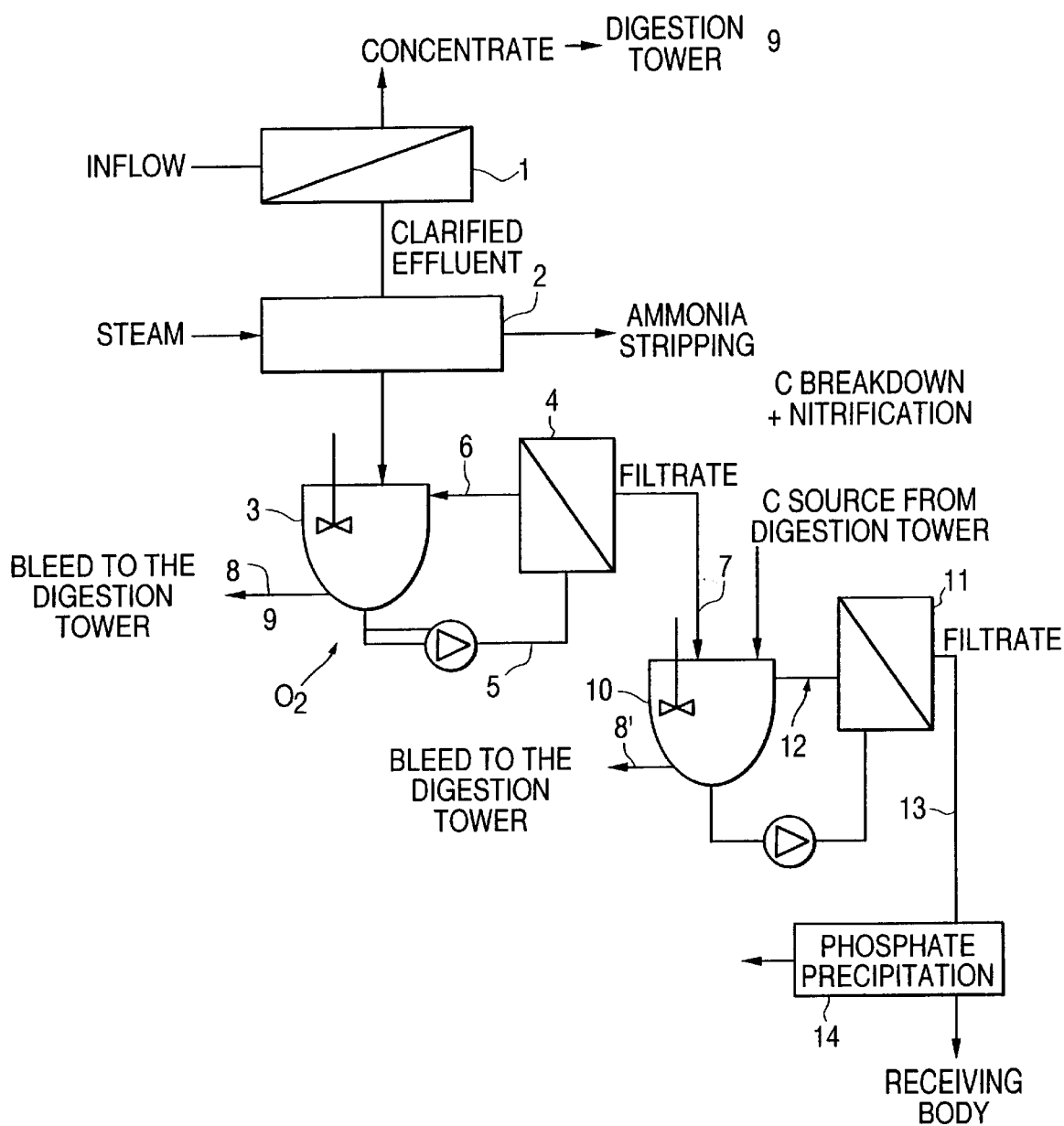

United States Patent
Troesch

[19]

[11] Patent Number: 6,146,532
[45] Date of Patent: Nov. 14, 2000

[54] PROCESS FOR THE BIOLOGICAL PURIFICATION OF WASTEWATER

[75] Inventor: Walter Troesch, Stuttgart, Germany

[73] Assignee: Fraunhofer-Gesellschaft Zur Foerderung Der Angewandten Forschung E.V., Munich, Germany

[21] Appl. No.: 09/155,856
[22] PCT Filed: Apr. 2, 1997
[86] PCT No.: PCT/DE97/00671
  § 371 Date: Jan. 26, 1999
  § 102(e) Date: Jan. 26, 1999
[87] PCT Pub. No.: WO97/37941
  PCT Pub. Date: Oct. 16, 1997

[30] Foreign Application Priority Data

Apr. 3, 1996 [DE] Germany .................. 196 13 397

[51] Int. Cl.⁷ .................................................. C02F 3/30
[52] U.S. Cl. .................. 210/626; 210/630; 210/631; 210/638; 210/903; 210/906
[58] Field of Search .................. 210/613, 620, 210/626, 631, 638, 630, 903, 906

[56] References Cited

U.S. PATENT DOCUMENTS

| | | |
|---|---|---|
| 4,812,237 | 3/1989 | Cawley et al. .................. 210/631 |
| 5,024,937 | 6/1991 | Penticoff et al. ................ 210/631 |
| 5,039,416 | 8/1991 | Loew et al. .................... 210/631 |
| 5,204,001 | 4/1993 | Tonelli et al. .................. 210/626 |
| 5,254,253 | 10/1993 | Behmann ....................... 210/626 |
| 5,746,920 | 5/1998 | Boergardts et al. .............. 210/631 |
| 5,910,249 | 6/1999 | Kopp et al. .................... 210/631 |

FOREIGN PATENT DOCUMENTS

| | | |
|---|---|---|
| 53-135167 | 11/1978 | Japan . |
| 93/01138 | 1/1993 | WIPO . |
| 97/28101 | 8/1997 | WIPO . |

OTHER PUBLICATIONS

Steel R McGhee "Water Supply and Sewerage" 5th Edition, pp. 501 and 524–529, 1979.
P. Kunz, "Behandlung von Abwasser", 3rd edition, Vogel–Buchverlag 1992, pp. 49, 68–69, 205.
Herder "Lexikon der Biochemie und Molekularbiologie", Spektrum Akademischer Verlag, 1995, pp. 235–236.
"Lehr– und Handbuch der Abwassertechnik", 3rd edition, 1985, vol. 5, pp. 34–44, Verlag Ernst & Sohn.

*Primary Examiner*—Christopher Upton
*Attorney, Agent, or Firm*—Foley & Lardner

[57] ABSTRACT

The present invention relates to a process for the biological purification of wastewater in which a liquid stream is fed to the aerobic biological purification stage, which liquid stream has already been freed in advance from undissolved substances using a membrane separation process.

12 Claims, 1 Drawing Sheet

PROCESS FOR THE BIOLOGICAL PURIFICATION OF WASTEWATER

The present invention relates to the field of wastewater treatment, more precisely in particular the treatment of municipal and industrial wastewaters.

From the aspect that every form of biomass, including organic waste, is carbon-bound solar energy, and that economic handling of energy is the supreme directive for action for the future, current sewage treatment technology must be considered from a different perspective.

The current position in the sewage treatment plant field is open wastewater basins. Because aerosol formation cannot be prevented during the aeration of open basins, and volatile wastewater constituents can also be emitted, sewage treatment plants, on account of odor nuisances resulting therefrom, are frequently built far away from settlements. This causes high costs (material and energy costs) for laying sewers. At the same time, a long sewer is nothing else than a tubular bioreactor in which organic substance is converted in a highly uncontrolled manner. Since in the sewer grid oxygen input cannot be prevented, aerobic mineralization takes place, i.e. 50% of the organic substance converted there is lost in the form of industrially unutilizable heat. Facultative anaerobes predominate in this conversion, since sufficient supply with oxygen is not always ensured. Even if they are removed in the primary sedimentation, they are not digestible in the digestion tower and are thus not available for energy recovery. They arrive unutilized on the landfill and there possibly cause secondary problems.

In the case of the activation tanks, the oxygen input does not proceed in a similar manner to the COD input, and in flat basins, the utilization of atmospheric oxygen is frequently very low, based on the input power. In comparison with the state of the art, energy is destroyed on a massive scale. Furthermore, the concentration of the biocatalysts, specifically the active organisms, is very low, so that the reaction rate in the activation plants is very low. However, since solids other than active biocatalysts also pass into the activation plants, specific increase of the biocatalyst concentration is not possible.

The upstream denitrification and the recycling of a wastewater partial stream downstream of nitrification in the activation to the anaerobic denitrification promotes the development of facultative anaerobes in the secondary sludge. It has been proposed to increase the sludge age by downstream connection of a filter. The purpose of this mode of operation is increased sludge consumption, since energy is converted into unutilizable heat because of a decrease of organic substance caused by repeated catabolism of dead biomass.

The facultative anaerobes preferably formed again withstand digestion (see above). They are thus no longer available for material/energy recycling. In addition, the volume of the bioreactors is considerably increased by the high hydraulic recirculation.

Digestion towers serve to stabilize sewage sludges prior to the deposition in agriculture or the refuse tip. They are not designed as a net energy production plant with respect to their residence time and their integration into energy grids. The spatial separation of the sewage treatment plant from heat consumers does not permit efficient heat and power cogeneration via block combined heat and power stations. Thus in the most favorable case, digester gas is converted into electricity and serves alone to reduce the electrical energy consumption in the sewage treatment plant. Not infrequently, digester gas is flared off. The high residence times in digestion towers not only starve the bacteria catalyzing the digestion process, but occasionally lead, because of the unfavorable ratio of volumetric energy production and thermal radiation in winter, to additional energy consumption during thermostating of the digester material.

The industrial purification of wastewater has found better approaches to solution of the problem, for economic reasons—though the industrial implementation has not taken place until the course of the last 10–15 years. Those which may be mentioned here are the tower/high biologies of the companies Bayer AG and Hoechst AG or the experiments using industrial fluidized bed reactors by Gist-Brocades. Likewise, the industry initially recognized the economic advantages which anaerobic wastewater purification has compared with aerobic purification, and used biogas reactors for wastewater purification, especially in the food industry sector.

It is the object of the present invention to modify the biological wastewater purification, in particular that of municipal or industrial wastewaters, in such a manner that space-saving units can be used which may be installed in the vicinity of the wastewater production sources, while at the same time the energy balance of the overall process turns out as favorably as possible.

The object is achieved by means of the fact that, prior to the start of the diverse possible organic fermentation reactions, but in particular prior to the start of the aerobic breakdown, the undissolved substances are quantitatively separated off using a membrane separation process. A separation of this type is possible, for example, using a microfiltration membrane, a nanofiltration membrane, an ultrafiltration membrane or else using reverse osmosis as final and, if appropriate, single separation stage. If appropriate, a plurality of separation stages can follow one after the other in a logical sequence (from coarse to fine) e.g. a microfiltration upstream of an ultrafiltration. Unpressurized stages such as a coarse filtration can also be provided upstream. Ceramic microfiltration membranes or ultrafiltration membranes, which have only been available recently, offer high transmembrane fluxes, good regenerability and durability for a use as separation medium.

The quantitative separation of organic solids and other undissolved substances which was not possible in the prior art, the primary clarification in the form of a sedimentation, effects the formation of two mass streams, that is to say a concentrate and a filtrate (except in the case of reverse osmosis, in which, in addition to the concentrate, water is produced as "diluate"). The concentrate can be set to a solids content of 3 to 15% by weight of dry matter, preferably 5 to 12%. by weight, and very particularly preferably about 10% by weight of dry matter. At such a concentration, the concentrate stream is particularly suitable for being fed directly to an anaerobic fermentation in a bioreactor, for example a digestion tower. In the concentration range specified as preferred, the methanization of organic matter has proved to be particularly suitable. The measures according to the invention make possible a high space velocity (that is small reactors) with maximum degree of breakdown and, coupled thereto, with maximum energy yield.

The filtrate from the membrane separation stage comprises only dissolved organic compounds which can pass through the corresponding membrane. An enrichment of organic solid which is not actively multiplying biomass can thus be excluded. Therefore, the preferably sought-after activation which should follow the separation step has only a low load, since the majority of the organic mass was passed to the anaerobic stage (maximum energy recycling).

The oxygen demand in the aerobic biological stage is therefore also reduced in comparison with the prior art (low energy consumption). All of the bacteria required for breakdown of the COD are always present, only the active bacteria multiply specifically.

The activation stage selected is preferably a completely mixed closed bioreactor having a high biologically active catalyst concentration. $O_2$-regulated bioreactors related to the actual breakdown rate of active bacteria present in high concentration in slender high reactors having energy-saving $O_2$ input technology are preferred, since this gives considerable savings of energy from fossil sources and at the same time the spatial requirement for wastewater purification can be decreased. In order to achieve a high catalyst concentration and thus high productivity rates, it is advisable to equip the bioreactor (fermenter) with a cell retention system. This leads to markedly higher productivities. For the cell recirculation, a partial stream is taken off from the fermenter and circulated via a cell retention system. This can likewise comprise a membrane filter or can comprise such a membrane filter. A cell-free permeate stream is withdrawn from the cell retention system. The retentate is recycled to the fermenter.

In addition, ejection of biocatalyst material (a so-called "bleed stream") can be provided. In such a case, the concentration of the biocatalysts is under open-loop control via the recycle rate and the bleed stream, that is the rate of ejection of biocatalysts from the reactor, and is under feedback control in the optimum range, based on the influent water rate and the COD loading. High biomass concentrations make very short residence times possible and the submerged biomass in the fermenter guarantees, in contrast to the biofilm of the reactors which are generally currently used, high purification rates, since there are no diffusion limitations, as in the biofilm.

The concentration of the biocatalysts which can be achieved in the fermenter can be up to at least 40 g/l. Even higher concentrations are possible, although the oxygen supply is then less favorable. Achieving such high concentrations has the consequence that the ejected bleed stream can also have a biomass content of 40 g/l. This is a value which is twice as high as that achieved with the use of customary reactors.

The bleed stream taken off can likewise be passed directly to an anaerobic fermenter, e.g. the same digestion tower to which the concentrate from the first membrane filtration stage was fed.

In contrast to previous practice, sewage sludges can be broken down to a very high degree of digestion with a very short residence time, as a result of which they are also automatically stabilized. Smaller reactors with high volumetric gas production lead to decreased radiation losses and increased net energy delivery. If the net energy-producing reactors are in the vicinity of the built-up areas, as is already demanded for the clarifying reactors, via efficient heat and power cogeneration, a tripling of the net energy delivery is possible. A further improvement is achieved by the abovementioned increase of the feed concentration of organic substances to the bioreactor, as a result of which the energy efficiency can be still further increased.

The abovementioned combination of process stages makes further supplementation possible: thus, for example, the filtrate of the upstream membrane separation process can first be freed from dissolved inorganic substances still present before it is subjected to the aerobic fermentation. A separation of this type can be carried out, for example, by precipitation with base (to remove calcium and phosphate for example) or by steam stripping (to remove ammonia or the like).

The cell-free permeate stream leaving the aerobic fermentation is hygienically safe and can be fed directly to the receiving body. The use of precipitation and sedimentation aids is not necessary. If appropriate, a nitrification and/or denitrification in conventional form can be connected downstream.

The present invention and a number of supplementing possible process steps are to be described in more detail below with reference to the diagrammatic drawing of FIG. 1.

FIG. 1 shows the inflow of a wastewater into a module 1 in which undissolved substances are quantitatively separated off using a membrane separation process according to claim 1. The concentrate is fed to a digestion tower 9. The clarified effluent only comprising dissolved compounds is subjected in 2 to a steam stripping to remove accompanying inorganic substances.

The clarified effluent further purified in this manner then enters the fermenter 3 which, by the diagrammatic representation of an agitator and the feed of $O_2$, is to be indicated as a completely mixed closed $O_2$-controlled bioreactor. From this, via the outlet line 5, a partial stream can be taken off from the fermenter and introduced into the cell retention system 4, the retentate stream 6 of which is recirculated into the fermenter, while the filtrate 7 can be fed to further pretreatment steps before it passes into the receiving body. In addition, a bleed stream can be ejected from the fermenter 3 via the line 8, which bleed stream is further treated anaerobically in the digestion tower 9.

The filtrate 7 from the cell retention system 4 can be fed to a nitrification/denitrification which, like the aerobic fermentation, can be performed in a completely mixed rector 10 having cell recirculation 11. Here also, the bleed stream 8' to the digestion tower 9 and the recirculation rate at which the retentate is recirculated via 12 to the fermenter 10 can be controlled under open- and closed-loop control in such a manner that the reactor 10 operates in the optimum range. Before the filtrate 13 is fed to the receiving body, further inorganic impurities can be separated off; here, as a representative, phosphate precipitation 14 is specified in the diagrammatic drawing. The supernatant or filtrate of this stage is then disposed of as usual.

The advantage of the above-described membrane separation is that the overall wastewater purification, on account of the measures according to the invention, proceeds in completely closed systems, has only a small space requirement, so that the wastewater treatment can be installed in inner cities (which in turn leads to savings in the laying of the sewer network), is hygienically safe, so that the receiving body is not polluted, or is only minimally polluted, with germs, and furthermore is flexible and can be scaled up, so that it is also suitable for very different demand volumes. The process is, furthermore, particularly advantageous from the aspects of the energy balance, since a high proportion of the feed organics are passed directly for utilization in the biogas reactor.

What is claimed is:

1. A process for the biological purification of wastewater, comprising the steps of:

quantitatively separating off undissolved substances upstream of a first, aerobic biological purification step, using a membrane separation process; and feeding the filtrate stream produced in the membrane separation to an aerobic fermentation; and feeding the concentrate stream produced in the membrane separation into an anaerobic fermentation.

2. A process according to claim 1, wherein the membrane separation process is single-stage or multistage, and wherein the single or last stage is selected from filtration and reverse osmosis.

3. A process as in claim 2, wherein the filtration is selected from the group consisting of microfiltration, nanofiltration and ultrafiltration.

4. A process according to claim 1, further comprising setting the solids content of the concentrate stream at 3–15% by weight.

5. A process according to claim 1, further comprising removing accompanying inorganic substances from the filtrate stream upstream of the aerobic fermentation.

6. A process according to claim 5, wherein the accompanying inorganic substances are removed by precipitation or steam stripping.

7. A process according to claim 1, wherein the filtrate stream is fermented aerobically in an aerated completely mixed fermenter, and wherein the process further comprises retaining cells from the fermentation broth leaving the fermenter for secondary purification by using a filtration unit and partially or completely recirculating the cells.

8. A process according to claim 7, further comprising controlling the biocatalyst concentration in the aerobic fermenter by openloop control via the recirculation rate and the ejection rate of the biocatalyst from the reactor and adjusting the biocatalyst concentration to an optimum range.

9. A process according to claim 7 further comprising feeding the filtrate of the fermentation broth fed to a filtration unit.

10. A process according to claim 7 further comprising feeding the biocatalysts ejected from the aerobic fermentation reactor to an anaerobic bioreactor.

11. A process according to claim 10, further comprising feeding the concentrate stream produced in the membrane separation and the ejected biocatalysts to the same anaerobic bioreactor.

12. A process according to claim 9, further comprising after nitrification and/or denitrification and/or phosphate precipitation, feeding the filtrate of the fermentation broth to a receiving body.

* * * * *